United States Patent
Heim et al.

(10) Patent No.: US 8,008,899 B2
(45) Date of Patent: Aug. 30, 2011

(54) METHOD OF CONTROLLING A DC-DC CONVERTOR IN DISCONTINUOUS MODE

(75) Inventors: Pascal Heim, Saint-Aubin (CH);
Jean-Félix Perotto, Colombier (CH)

(73) Assignee: The Swatch Group Research and Development Ltd., Marin (CH)

( * ) Notice: Subject to any disclaimer, the term of this patent is extended or adjusted under 35 U.S.C. 154(b) by 390 days.

(21) Appl. No.: 12/407,455

(22) Filed: Mar. 19, 2009

(65) Prior Publication Data
US 2009/0237039 A1    Sep. 24, 2009

(30) Foreign Application Priority Data
Mar. 19, 2008   (EP) .................................... 08153003

(51) Int. Cl.
*G05F 1/10*   (2006.01)
*G05F 1/40*   (2006.01)
(52) U.S. Cl. ........................................ 323/222; 323/271
(58) Field of Classification Search .................. 323/222, 323/225, 268, 271, 282, 285
See application file for complete search history.

(56) References Cited

U.S. PATENT DOCUMENTS

| | | | | |
|---|---|---|---|---|
| 5,414,341 A | * | 5/1995 | Brown | ............................ 323/268 |
| 5,982,160 A | | 11/1999 | Walters et al. | |
| 6,828,762 B2 | * | 12/2004 | Brkovic | ............................ 323/222 |
| 7,196,499 B1 | * | 3/2007 | Lipcsei | ............................ 323/222 |
| 7,279,877 B1 | | 10/2007 | Tseng | |
| 7,548,050 B2 | * | 6/2009 | Shirai et al. | ...................... 323/285 |
| 2005/0258808 A1 | | 11/2005 | Chen et al. | |

FOREIGN PATENT DOCUMENTS

JP    2002-112534 A    4/2002

OTHER PUBLICATIONS

European Search Report issued in corresponding application No. EP 08 15 3003, completed Oct. 20, 2008.

* cited by examiner

*Primary Examiner* — Matthew Nguyen
(74) *Attorney, Agent, or Firm* — Griffin & Szipl, P.C.

(57) ABSTRACT

A DC-DC converter includes an induction coil cooperating with two switches, which operate alternately, to supply output voltage of a determined level relative to input voltage. The converter control method includes, in each cycle, a first phase of first duration with first switch controlled to make it conductive, and to increase current in the induction coil, and a second phase with second switch controlled to be conductive and to decrease current in the induction coil during a second adjustable time period. Detection device detects, at the end of the second phase, sign of overvoltage across one terminal of the induction coil connected to the switches, and supplies a detection signal kept in a high or low state, depending upon sign of detected overvoltage. Timing device receives detection signal for adapting, in each successive cycle, the second duration of the second phase to cancel out current in the induction coil.

11 Claims, 7 Drawing Sheets

METHOD OF CONTROLLING A DC-DC CONVERTOR IN DISCONTINUOUS MODE

This application claims priority from European Patent Application No. 08153003.2 filed Mar. 19, 2008, the entire disclosure of which is incorporated herein by reference.

FIELD OF THE INVENTION

The invention concerns a method of controlling a DC-DC converter operating in discontinuous mode.

The invention also concerns a DC-DC voltage converter for implementing the control method.

BACKGROUND OF THE INVENTION

The DC-DC voltage converter of the present invention is of the inductive switched-mode type, i.e. with an induction coil as the reactive element. It can convert a continuous input voltage into a continuous output voltage of the converter that generally has a different value from the input voltage. The input voltage is supplied mainly by a battery or accumulator, which means that the value of the input voltage can decrease over time, particularly when the DC-DC converter is operating. However, the converter must be able to guarantee an output voltage at a determined value, normally independently of the drop in input voltage, at a minimum operating value, and as a function of the output load.

There exist three types of inductive converters. A first type of inductive converter is the Buck converter, which can supply an output voltage of lower value than the input voltage value. A second type of inductive converter is the Boost converter, which can supply an output voltage of higher value than the input voltage value. Finally, a third type of inductive converter is a combination of a Buck converter and a Boost converter. This third type of converter can either raise the output voltage level relative to the input voltage level, or lower the output voltage level relative to the input voltage level.

One important peculiarity of an inductive converter is that it can continuously regulate the conversion rate simply by adjusting the duty cycle of the clock signal. Depending upon the converter configuration, a first clock signal is used to control at least a first switch, in order to increase the current in a linear manner through the induction coil in a first phase T1. This current through the induction coil is drawn from a continuous input voltage source, which may preferably be a battery or an accumulator. A second clock signal is used to control at least a second switch, in order to reduce the current through the induction coil in a linear manner in a second phase T2, as explained below. Preferably, the current in the induction coil must decrease to zero value for a DC-DC converter operating in discontinuous mode.

One problem that generally arises is being able to control properly the duration of the second phase T2, so that the current in the induction coil is zero at the end of period T2. Usually, this period T2 is controlled by measuring the residual voltage across one terminal of the second switch responsible for decreasing the current in the induction coil, relative to earth. When this voltage is zero, this means that the current is also zero through the induction coil. However, the practical difficulty of such a measurement is that the residual voltage is very low, for example of the order of ten millivolts. This means using a comparator with a very low offset. Moreover, the comparator used has to be extremely rapid, otherwise the second phase T2 is liable to extend beyond its ideal value, and an inverse current may arise in the induction coil. This thus results in a loss in the converter's efficiency.

One technique for overcoming the aforementioned difficulty is disclosed in U.S. Pat. No. 7,279,877 relating to a Buck converter. In this patent, a comparator, which defines the instant at which the current in the induction coil is zero, has an offset adjusting device. Just after the end of period T2, the overvoltage across one of the poles of the induction coil is measured. The sign of this overvoltage is representative of the current that is flowing in the induction coil. Depending upon the overvoltage sign, the comparator offset is corrected, to adjust period T2 to a value corresponding to zero current in the induction coil. With this method, it is still necessary to use a rapid comparator for measuring the low residual voltage across the induction coil switch, as for the method of the aforecited prior art, which is a drawback.

SUMMARY OF THE INVENTION

It is therefore an object of the invention to overcome the drawbacks of the state of the art, by providing a method of controlling a DC-DC converter operating in discontinuous mode, which can easily adjust the duration of the second phase by measuring the sign of the overvoltage generated by the induction coil at the moment of switching, at the end of the second phase.

The invention therefore concerns, according to a first embodiment, the aforecited method of controlling a DC-DC converter, wherein the DC-DC converter includes an induction coil as a reactive element, for supplying, in cooperation with a set of at least two alternately operating switches, an output voltage with a higher, equal or lower level than the level of an input voltage provided by a continuous voltage source, wherein the method includes the steps of: (a) in each successive control cycle, a first phase wherein a first control signal controls at least a first switch to make the switch conductive and to increase a current through the induction coil during a first determined duration, wherein the method includes, (b) after the first phase, a second phase, wherein a second control signal controls at least a second switch to make the switch conductive and to decrease the current through the induction coil during a second adjustable duration, and detection means are provided for detecting, at the end of the second phase, the sign of any overvoltage across one of the terminals of the induction coil, connected to the switches and for supplying a detection signal, which is maintained for a determined duration, prior to detection of another successive cycle, in a high state or a low state depending upon the detected overvoltage sign, and timing means, which receive the detection signal operate to adapt, in each successive cycle, the second duration of the second phase so as to cancel out the current in the induction coil at the end of the second phase.

Particular steps in the DC-DC converter control method are defined in dependent claims 2 to 7.

One advantage of the DC-DC converter control method according to the invention lies in the fact that the duration of the second phase wherein a current in the induction coil is in a decreasing phase, can be adapted by indirectly measuring the induction coil current. To do this, the sign of the overvoltage, which is generated by the induction coil during switching at the end of the second phase, can adjust the duration of the second phase in a digital manner, in accordance with the on-off principle. It is thus no longer necessary to use a rapid comparator for measuring the very low offset voltage at the zero crossing of the induction coil current.

The DC-DC converter of the present invention exploits the sign of the overvoltage across the induction coil when the switch is opened at the end of the second phase period T2. However, detection of the overvoltage sign acts differently on a loop for regulating this duration T2. Indeed, instead of correcting the offset of a rapid comparator, which measures the residual voltage across a switch, as mentioned by U.S. Pat. No. 7,279,877, in the present invention, duration T2 is adapted via a simple integrator. This removes the need for any controlled offset rapid comparator and greatly simplifies the regulating loop of duration T2.

Exploitation of the overvoltage sign in accordance with the present invention is totally different from the conventional approach of detecting the zero crossing of the induction coil current by measuring the very low residual voltage across the switch concerned, in the case of a Buck converter, for example. Measuring the overvoltage, and in particular the sign thereof, relative to the output voltage, means that the sign of the current, which is flowing in the induction coil just after the end of second phase period T2, can be directly provided. Thus, exploitation of this sign, which is consequently a binary variable, is the basis of the present invention. Thus, the efficiency of the low power DC-DC converter is greatly increased compared to DC-DC converters of the state of the art.

The invention also concerns, in accordance with an eighth embodiment, a DC-DC converter for implementing the control method of the first embodiment of the invention, wherein the DC-DC converter includes: an induction coil as a reactive element, for supplying, in cooperation with a set of at least two alternately operating switches, an output voltage with a higher, equal or lower level than the level of an input voltage provided by a continuous voltage source, wherein at least a first switch is controlled by a first control signal in a first phase of a control cycle, whereas at least a second switch is controlled by a second control signal in a second phase, wherein the DC-DC converter also includes detection means, which are provided for detecting, at the end of a second phase of each control cycle, the sign of any overvoltage across one of the terminals of the induction coil connected to the switches and for supplying a detection signal, which is in a high state or in a low state depending upon the detected overvoltage sign, to timing means, which can adapt, in each successive cycle, the second duration of the second phase so as to cancel out the current in the induction coil at the end of the second phase.

Particular embodiments of the DC-DC converter are defined in dependent claims 9 to 11.

BRIEF DESCRIPTION OF THE DRAWINGS

The objects, advantages and features of the DC-DC converter control method will appear more clearly in the following description, on the basis of non-limiting embodiments of the converter, illustrated by the drawings, in which.

DETAILED DESCRIPTION OF THE INVENTION

In the following description, all of the elements of the various types of DC-DC converter used for implementing the control method, which are well known to those skilled in the art in this technical field, will be described only in a simplified manner. To understand the DC-DC converter control method, reference is first of all made to the explanation of the basic elements of the various types of DC-DC converter.

Figure 1A:
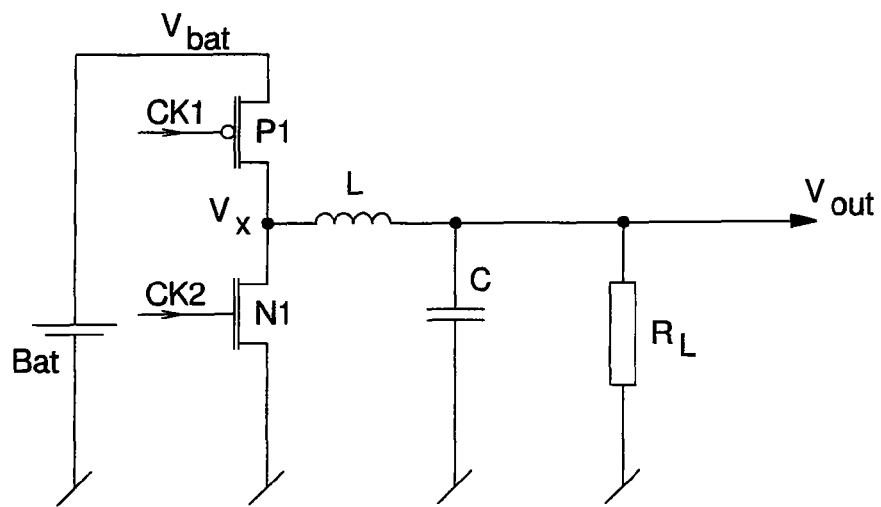
FIG. 1a shows, in a simplified manner, a first basic embodiment of a DC-DC converter for implementing the control method.

FIG. 1a shows schematically a Buck DC-DC converter, i.e. a voltage reducer converter with a lower output voltage level than the continuous input voltage level. The reduction in output voltage Vout relative to the input voltage Vbat depends upon the durations of the first and second phases T1 and T2, and is a function of the ratio T1/(T1+T2). The input voltage Vbat is preferably supplied by a battery Bat, whereas at the output Vout, the capacitor C, in parallel with a load resistor $R_L$, performs filtering.

The DC-DC converter includes, in particular, an induction coil L as the reactive element, a PMOS transistor P1 and an NMOS transistor N1, as switches. The PMOS and NMOS transistors P1 and N1 are series connected with their source terminal respectively connected to each terminal of battery Bat. Transistors P1 and N1 are each controlled alternately by a respective control signal CK1 and CK2 across their respective gate terminal. The control signal CK1 defines the first phase of the control method, whereas signal CK2 defines the second phase of the method. The connection node of the drains of series transistors P1 and N1 is connected to one terminal of induction coil L, whereas the other terminal of induction coil L is connected to the converter output across capacitor C.

In normal operation, a first lock loop adapts the value of duration T1 of the first phase such that the output voltage Vout corresponds to a desired reference voltage. The value of duration T2 of the second phase is obtained by a second lock loop according to the invention.

Figure 1C:
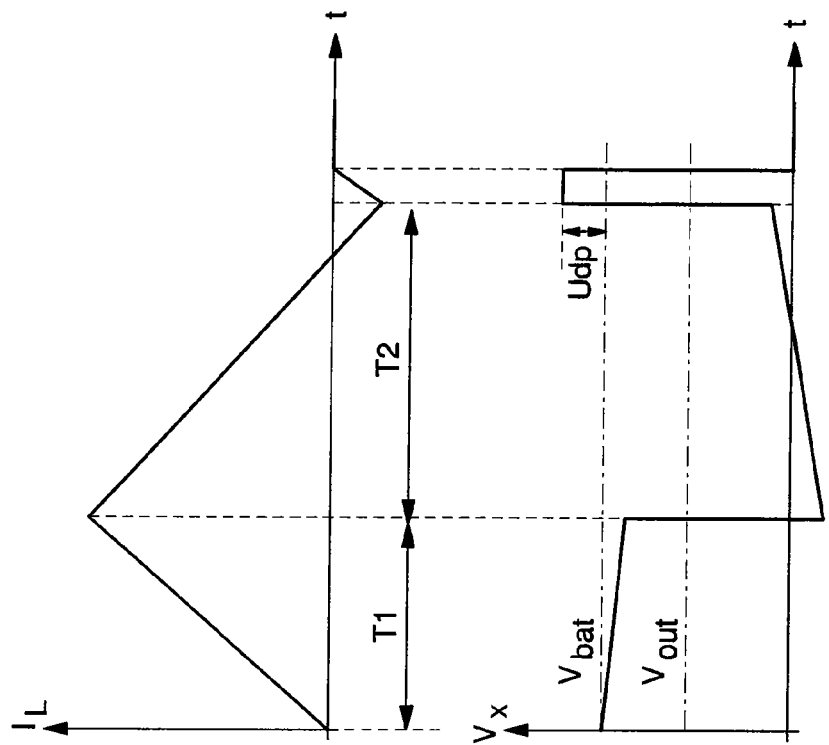
FIGS. 1b and 1c show, as a function of time, graphs of the shape of the current passing through the induction coil and the voltage at one terminal of the induction coil of the converter of FIG. 1a for a second phase duration of the control method that is too short, or too long.
Figure 1B:
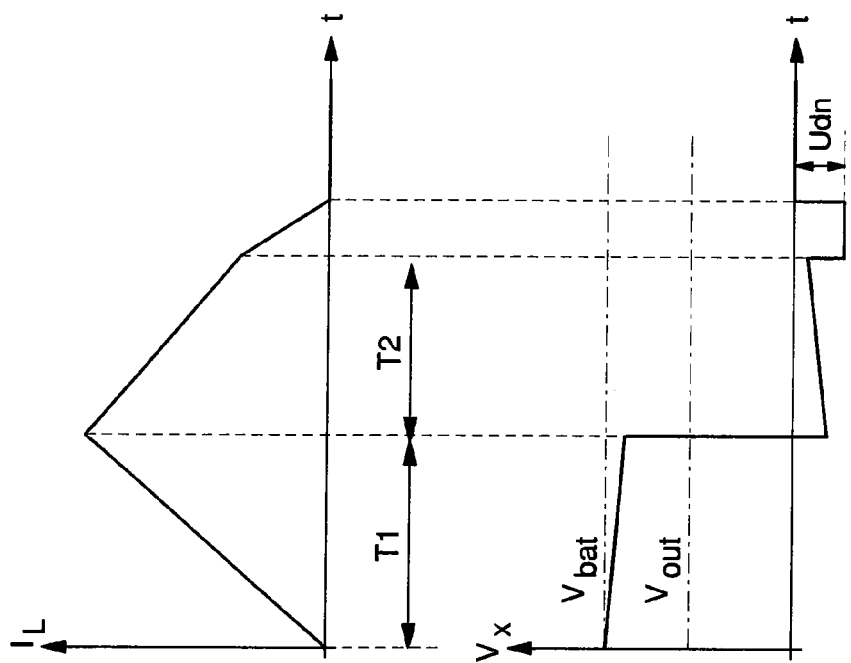

FIG. 1b shows a graph of the shape of current $I_L$ passing through the induction coil in the first and second phases. In the first phase of duration T1, the current increases linearly, whereas in the second phase of duration T2, the current decreases linearly. In the first phase of duration T1, the PMOS transistor P1 is made conductive by a control signal CK1 supplied across its gate terminal, whereas the NMOS transistor N1 is made non-conductive. In the second phase of duration T2 however, it is the NMOS transistor N1 that is made conductive by another control signal CK2 supplied across its gate terminal, whereas the PMOS transistor P1 is made non-conductive. The control signal CK1 must be in the low state to make PMOS transistor P1 conductive, whereas control signal CK2 must be in the high state to make NMOS transistor N1 conductive.

As can be seen in FIG. 1b, second phase duration T2 is too short. The current in the induction coil is thus not zero at the end of this second phase, and it is the substrate drain diode of NMOS transistor N1 that ensures that current $I_L$ decreases to 0. Thus, the voltage Vx at the connection node of induction coil L and the drain terminals of the two transistors P1 and N1 passes below 0 by a negative voltage value Udn at the end of duration T2, which means that duration T2 was too short.

FIG. 1c shows a graph of the shape of current $I_L$ passing through the induction coil in the first and second phases, and voltage Vx, but this time for a longer second phase duration T2 than that required to cancel out current $I_L$. At the end of duration T2, the substrate drain diode of PMOS transistor P1 cancels out the current, this time by generating a higher voltage Vx than the input voltage Vbat of a direct diode voltage Udp.

Thus, at the end of duration T2, there is a large variation in this voltage Vx as a function of duration T2, which may be too short or too long, relative to the optimum desired duration. This large voltage difference, or preferably the sign thereof relative to output voltage Vout, can easily be used to regulate duration T2 in accordance with the control method of the invention described below.

Figure 2A:
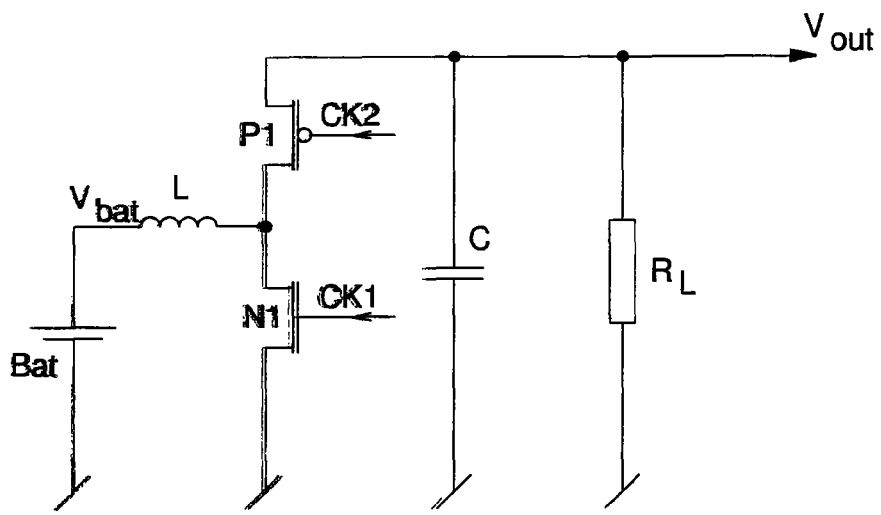
FIG. 2a shows, in a simplified manner, a second basic embodiment of a DC-DC converter for implementing the control method.

FIG. 2a shows schematically a Boost DC-DC converter. This type of converter can increase the output voltage level Vout relative to the continuous input level Vbat. The voltage boost ratio is given by the first and second phase durations T1 and T2, i.e. by the ratio (T1+T2)/T1.

The DC-DC Boost converter includes an induction coil L as the reactive element, a PMOS transistor P1 and an NMOS transistor N1 as switches. The PMOS and NMOS transistors P1 and N1 are series connected. The source terminal of transistor N1 is connected to an earth terminal, whereas the source terminal of transistor P1 is connected to an output terminal Vout where filtering is performed by capacitor C, in parallel with a load resistor $R_L$.

Transistors P1 and N1 are each alternately controlled by a respective control signal CK1 and CK2 across their respective gate terminal. Control signal CK1 defines the first phase of the control method whereas control signal CK2 defines the second phase of the method. Control signal CK1 has to be in the high state to make NMOS transistor N1 conductive, whereas control signal CK2 has to be in the low state to make PMOS transistor P1 conductive.

The connection node Vy of the drains of series transistors P1 and N1 is connected to one terminal of induction coil L, whereas the other terminal of induction coil L is connected to a positive terminal Vbat of a continuous voltage source. This continuous voltage source is preferably a battery Bat or an accumulator.

Figure 2C:
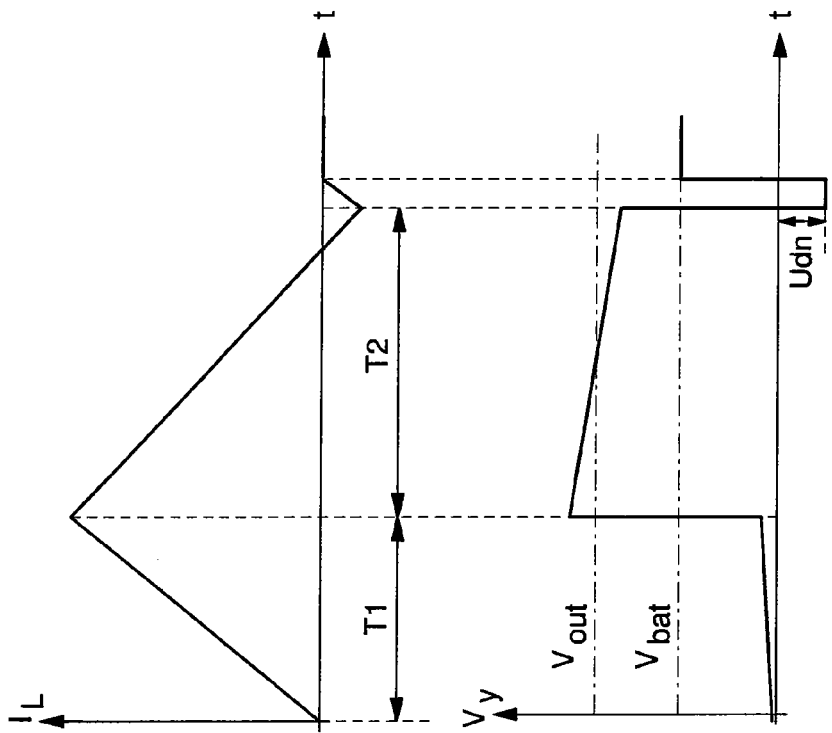
FIGS. 2b and 2c show, as a function of time, graphs of the shape of the current passing through the induction coil and the voltage at one terminal of the induction coil of the converter of FIG. 2a, for a second phase duration of the control method that is too short or too long.
Figure 2B:
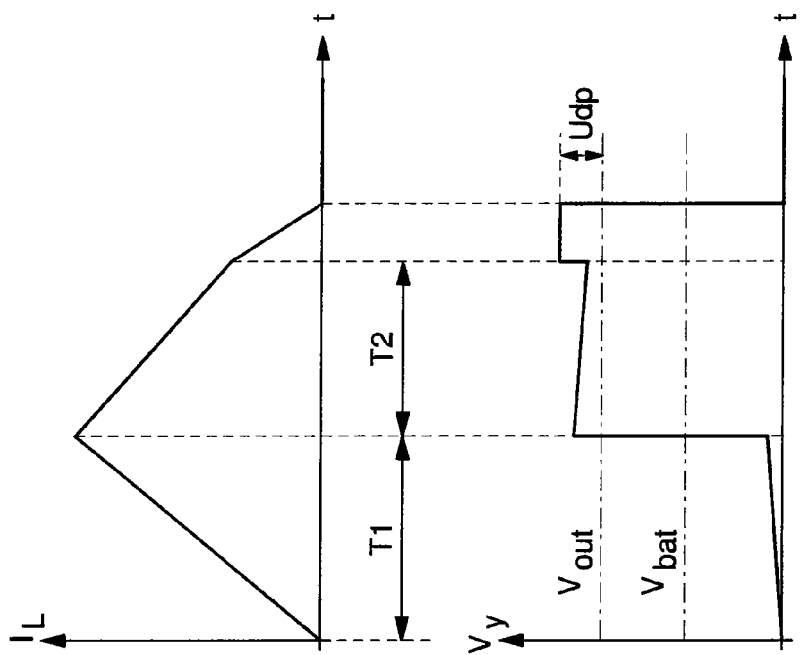

The wave shapes of current $I_L$ passing through induction coil L, and voltage Vy at the drain terminal connection node of transistors P1 and N1 and of induction coil L are shown in FIGS. 2b and 2c.

The wave shapes of the current through the induction coil in FIGS. 2b and 2c correspond to the wave shapes of the current described with reference to FIGS. 1b and 1c. However, the wave shapes of voltage Vy concerning overvoltage detection are the reverse of those of overvoltage Vx shown in FIGS. 1b and 1c. In the first case shown in FIG. 2b, phase duration T2 is too short. At the end of this period T2, the substrate drain diode of PMOS transistor P1 cancels out the current by generating a voltage Vy that is higher than the output voltage Vout of a direct diode voltage Udp.

In the second case shown in FIG. 2c, duration T2 is too long. At the end of this duration T2, the substrate drain diode of NMOS transistor N1 cancels out the current, this time by generating a voltage Vy with a negative voltage value Udn. Thus, as previously, the sign of induction coil voltage Vy, just after duration T2 to be adjusted, depends upon the sign of current $I_L$ passing through the induction coil.

Figure 3A:
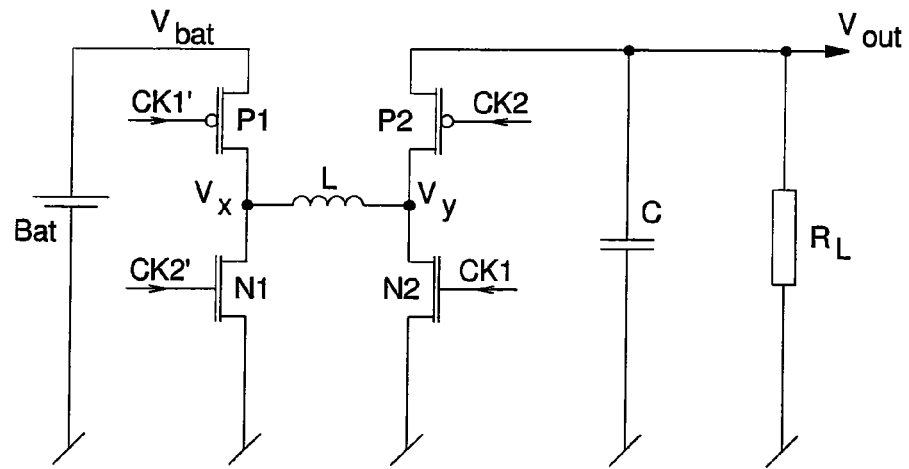
FIG. 3a shows in a simplified manner a third basic embodiment of a DC-DC converter for implementing the control method.

FIG. 3a shows schematically a DC-DC converter combining the Buck and Boost types. This type of converter can normally either increase, or decrease the output voltage level Vout relative to the continuous input voltage level Vbat. However, this type of converter can also provide an output voltage Vout of the same level as input voltage level Vbat. The voltage boost or reduction ratio is given by the first and second phase durations T1 and T2, i.e. by T1/T2.

The combined DC-DC converter includes an induction coil L as the reactive element, a first PMOS transistor P1, a first NMOS transistor N1, a second PMOS transistor P2, and a second NMOS transistor N2. The first PMOS and NMOS transistors P1 and N1 are series connected with their source terminal respectively connected to each terminal of a continuous voltage source, which may be a battery Bat. The drain terminal connection node of series transistors P1 and N1 is connected to a first terminal of induction coil L. The second PMOS and NMOS transistors P2 and N2 are series connected with their source terminal respectively connected to the output voltage terminal Vout and to the earth terminal. Each drain terminal Vy of these second transistors P2 and N2 is connected to a second terminal of induction coil L. Filtering is performed at the voltage output Vout by capacitor C in parallel with a load resistor $R_L$.

First of all, the first transistor P1 and the second transistor N2 are controlled to be made conductive in the same first phase of duration T1, each by a respective control signal CK1' and CK1, applied across their gate terminal. Control signal CK1 is in the high state, when reverse control signal CK1' is in the low state. In this first phase, second transistor P2 and first transistor N1 are not made conductive. In this first phase, a linearly increasing current passes through induction coil L.

In a second phase of duration T2 after the first phase, the second transistor P2 and first transistor N1 are each made conductive by a respective control signal CK2 and CK2' applied across their gate terminal. Control signal CK2' is in the high state, when reverse control signal CK2 is in the low state. In this second phase, the first transistor P1 and second transistor N2 are not made conductive. In this second phase, the current through induction coil L decreases normally to zero value if duration T2 is properly adjusted.

The wave shapes in FIGS. 3b and 3c correspond, as regards overvoltage detection, to the wave shapes described with reference mainly to FIGS. 2b and 2c. In the first case shown in FIG. 3b, duration T2 is too short. At the end of this duration T2, the substrate drain diode of second PMOS transistor P2 cancels out the current by generating a higher voltage Vy than output voltage Vout from a direct diode voltage Udp.

Figure 3C:
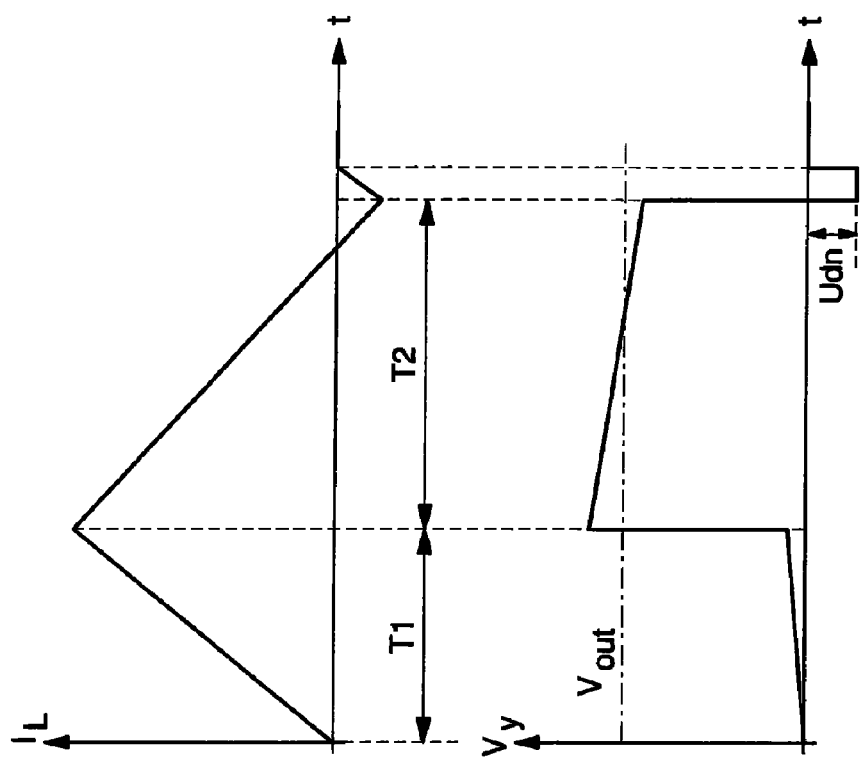
FIGS. 3b and 3c show, as a function of time, graphs of the shape of the current passing through the induction coil and the voltage at one terminal of the induction coil of the converter of FIG. 3a, for a second phase duration of the control method that is too short or too long.
Figure 3B:
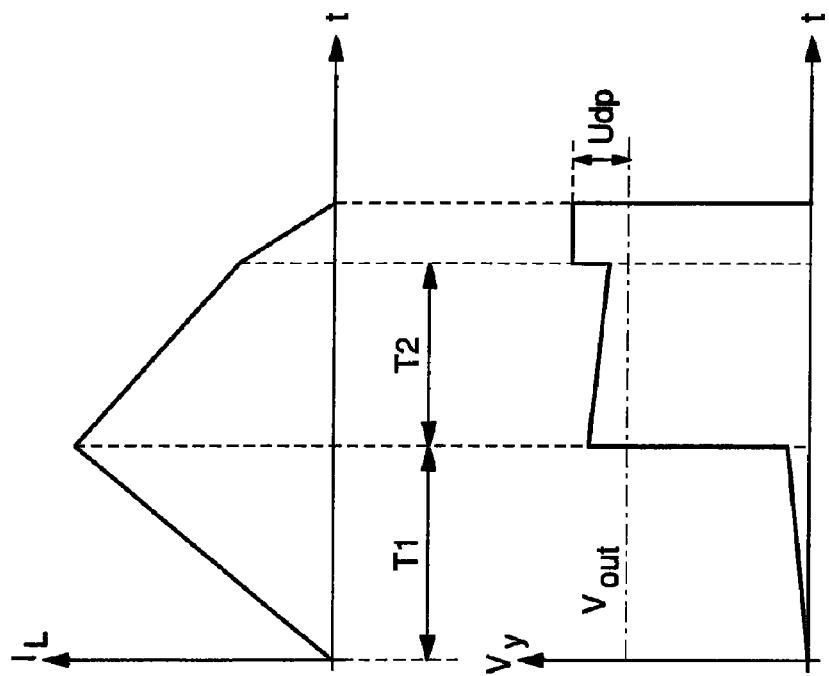

In the second case shown in FIG. 3c, duration T2 is too long. At the end of this duration T2, the substrate drain diode of the second NMOS transistor N2 cancels out the current, this time by generating a voltage Vy with a negative voltage value Udn. Thus, as previously, the sign of induction coil voltage Vy just after duration T2, which has to be adjusted, depends upon the sign of the current $I_L$ passing through induction coil L.

The DC-DC converter control method according to the invention will now be explained with reference to FIGS. 4a and 4b, which concern a Boost converter. However, it is evident that the method could apply to any type of DC-DC converter described above with an induction coil L as the reactive element.

As previously described, the voltage across one of the terminals of induction coil L is used to detect the sign of the voltage at the end of the second duration T2 of the second phase so as to correct duration T2 relative to an ideal value. Unlike the device disclosed in U.S. Pat. No. 7,279,877, which uses this information to adjust the offset of a rapid comparator detecting the zero crossing of the induction coil current, the control method according to the invention does not employ a rapid comparator for adjusting duration T2. Successive approximations are simply made on duration T2 to make it converge towards its optimum value.

Figure 4A:
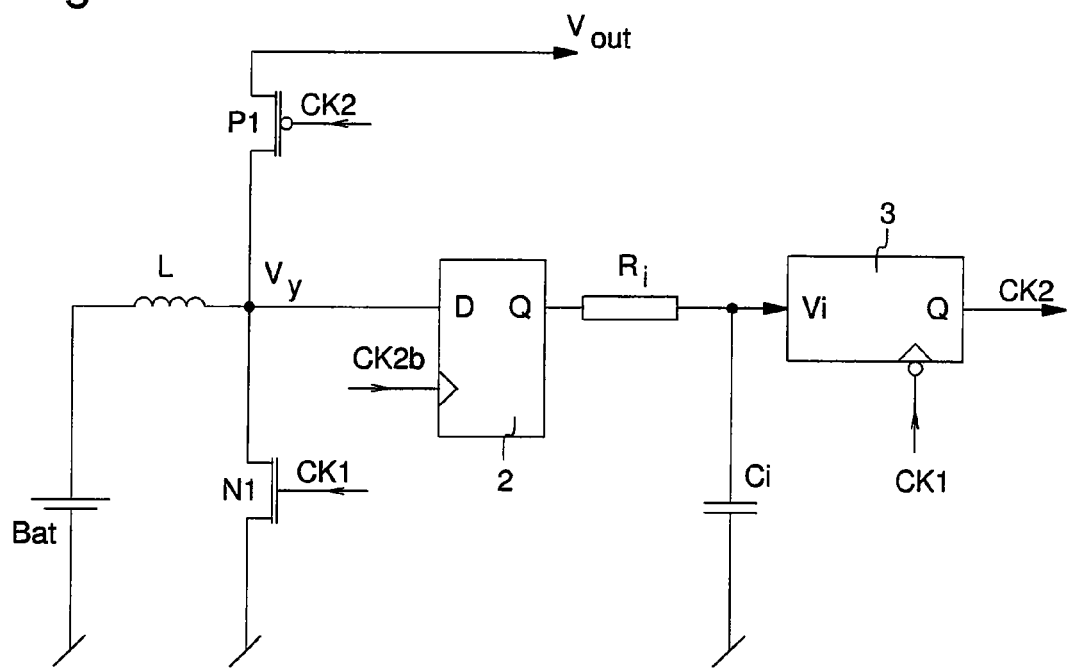
FIG. 4a shows, in a simplified manner, a first variant of the DC-DC converter of FIG. 2a, with its device for adjusting the duration of the second phase of the control method according to the invention.

FIG. 4a shows a first variant of the DC-DC converter with a device for generating and controlling duration T2 for implementing the control method according to the invention. The switches used in this embodiment of the DC-DC converter are preferably a PMOS transistor P1 and an NMOS transistor N1 mounted in series. The DC-DC converter type of FIG. 4a corresponds to the second embodiment described with reference to FIG. 2a. This type of DC-DC converter supplies an output voltage Vout at a higher level than the input voltage Vbat, which comes, for example, from a battery Bat.

This Boost DC-DC converter thus includes an inductive coil L, as the reactive element, a PMOS transistor P1 and an NMOS transistor N1. The PMOS and NMOS transistors P1 and N1 are series connected. The source terminal of transistor N1 is connected to an earth terminal, whereas the source terminal of transistor P1 is connected to an output terminal Vout. The drain connection node Vy of series connected transistors P1 and N1 is connected to one terminal of induction coil L, whereas the other terminal of induction coil L is connected to a positive terminal Vbat of a continuous voltage source. This continuous voltage source is preferably a battery Bat or an accumulator. For the sake of simplification, output capacitor C and load resistor $R_L$ are not shown.

Figure 4B:
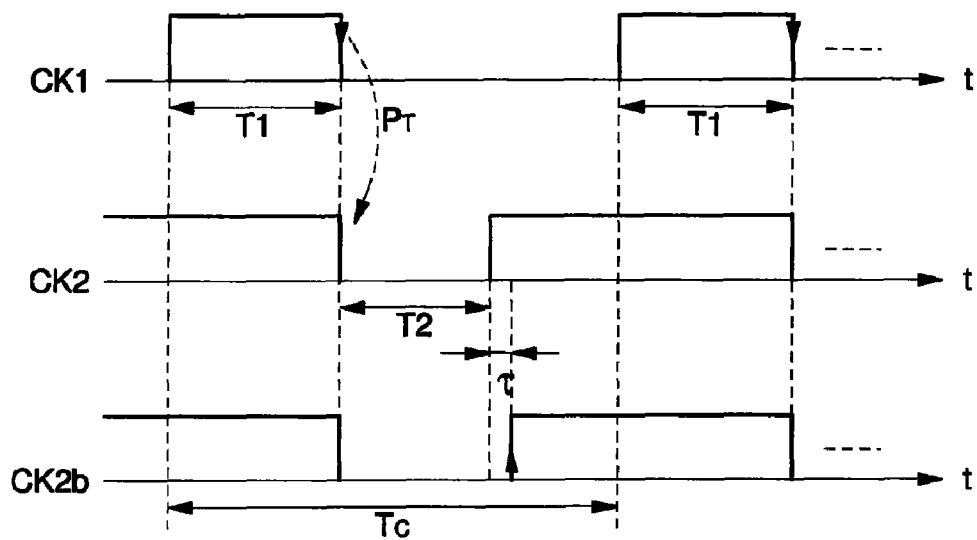
FIG. 4b shows, as a function of time, graphs of the control signals applied to different elements of the DC-DC converter of FIG. 4a in each cycle of the control method according to the invention.

As FIG. 4b also shows, a first control signal CK1 across the gate terminal of NMOS transistor N1 makes the transistor conductive during the first phase of duration T1. The first control signal is in state 1, i.e. a high state, during the first phase. This first control signal CK1 is supplied in a first lock loop that is not shown, since it is well known and does not form part of the present invention.

A second control signal CK2 across the gate terminal of PMOS transistor P1 makes the transistor non-conductive during the first phase, but conductive during the second phase of duration T2. During the first phase, the second control signal CK2 is thus in state 1, whereas it passes to state 0, i.e. the low state, at the start of the second phase. NMOS transistor N1 is made non-conductive during the second phase with first control signal CK1 passing to state 0. The falling edge of first control signal CK1 can be used for switching from the first phase to the second phase, as symbolically represented by the reference $P_T$ in FIG. 4b.

During the first duration T1 of the first phase, the current increases linearly through induction coil L, whereas during the second duration T2 of the second phase, the current decreases in the induction coil. The operating or clocking frequency of this converter may be comprised between several hundred Hertz and several Megahertz, for example of the order of 2 MHz with input voltage Vbat comprised between 0.9 and 3.3 V, for example. This frequency depends upon the value of induction coil L placed in the DC-DC converter.

In order to be able to adjust duration T2 of the second phase if the duration is too short or too long, the adjustment device includes means for detecting overvoltage across induction coil terminal Vy at the end of the second phase. These detecting means include a D flip-flop 2. The input of this D flip-flop can be directly connected to the connection node Vy of the drain terminals of transistors P1 and N1 with one terminal of induction coil L. The D flip-flop is clocked by a third control signal CK2b, whose rising edge is used for changing the state of input D at the non-inverting output Q. Non-inverting output Q of the flip-flop is connected to timing means, which include first of all a simple integrator, formed of a resistor Ri and a capacitor Ci. At each operating cycle $T_C$ of the DC-DC converter lock loop, integration is performed by arranging resistor Ri and capacitor Ci like a low pass filter. The voltage level across capacitor Ci enables a timer 3 of the timing means, which is clocked by the reverse of first clock signal CK1, i.e. on the falling edge of signal CK1, to supply an output signal CK2. This output signal CK2 acts like a second control signal defining the adapted duration T2 of the second phase in each cycle.

As shown in FIG. 4b, at the end of first phase T1, the second control signal CK2 becomes active to make PMOS transistor P1 conductive. As output voltage Vout is higher than input voltage Vbat, the current in the induction coil decreases. At a certain moment, determined by timer 3, the second control signal CK2 is made inactive and consequently blocks transistor P1. Given that the two transistors N1 and P1 are blocked and if the current through the induction coil is not zero, the current must tend towards 0 via the substrate drain diodes of transistors P1 or N1. The operating diode depends upon the direction of the current passing through the induction coil at the end of duration T2. Thus, this passage through the stray diodes creates a voltage Vy, which is higher than output voltage Vout, or less than 0 depending upon the diode used.

Third control signal CK2b is a replica of the second control signal CK2 for controlling, via its rising edge, the state of the input of the D flip-flop at output Q. However, the rising edge of the third control signal at the passage from state 0 to state 1 has a slight delay τ compared to the passage from state 0 to state 1 of second control signal CK2 defining duration T2. This slight delay τ is determined so as to leave voltage Vy time, at one terminal of the induction coil, to move in the proper direction, either above output voltage Vout, or below 0. This slight delay τ may be of the order of several nanoseconds.

All of these operations are repeated at the rhythm of the main converter clock. Output Q of the D flip-flop is thus a binary data flow. The mean of this binary data represents the control voltage V1 to be applied to timer 3. Thus, this timer supplies a second control signal CK2 of duration T2, which tends to move, by successive approximations, towards its ideal value. As indicated previously, a simple low pass filter, which is formed by resistor Ri and capacitor Ci, plays the part of binary flow integrator. This filter is sufficient to generate the continuous voltage V1 regulating the timer, so that the value of duration T2 is properly adjusted over successive regulating cycles, by simple electronic elements.

Figure 5B:
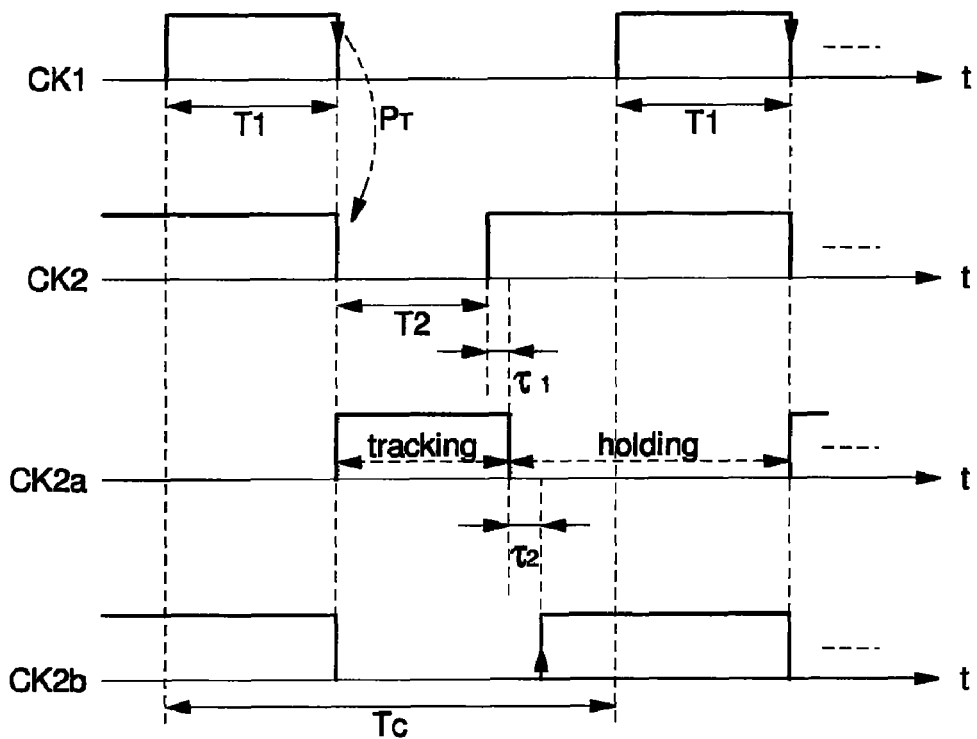
FIG. 5b shows, as a function of time, graphs of the control signals applied to the different elements of the DC-DC converter of FIG. 5a in each cycle of the control method according to the invention.
Figure 5A:
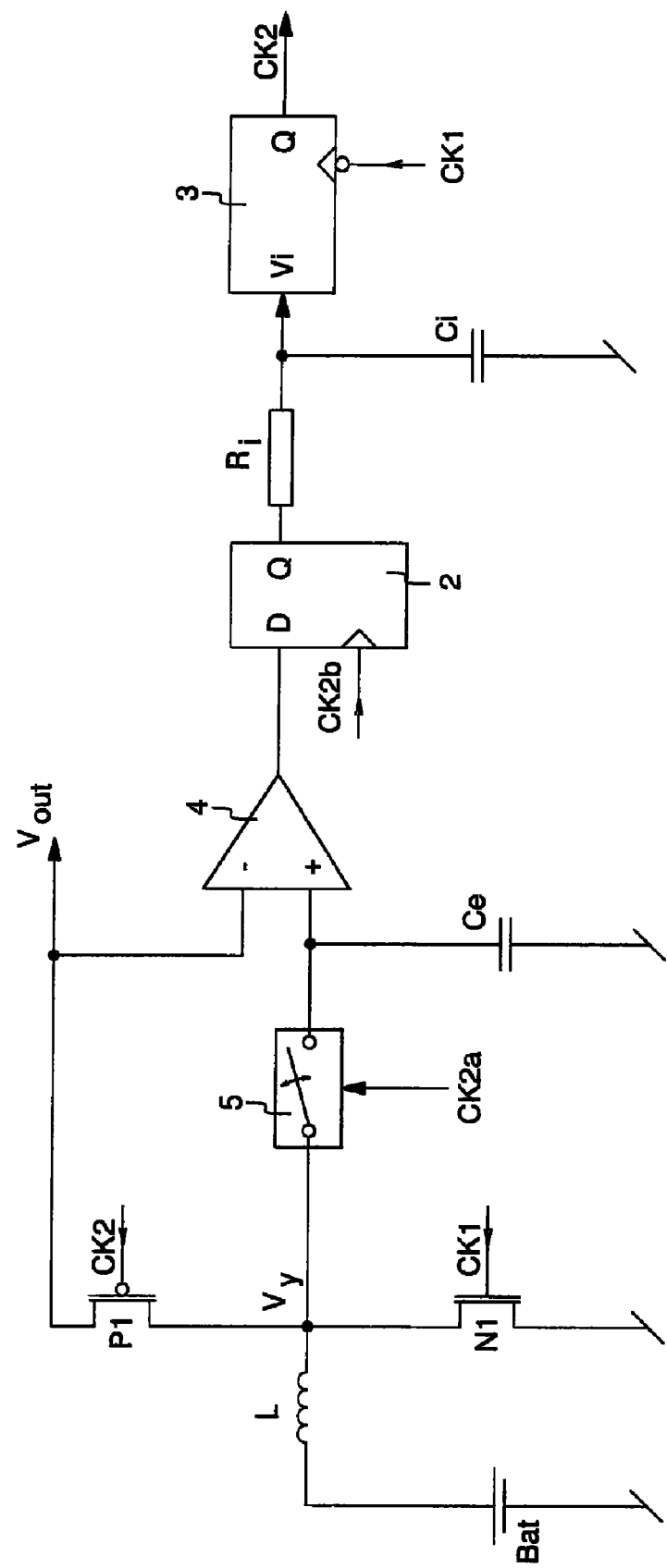
FIG. 5a shows, in a simplified manner, a second variant of the DC-DC converter of FIG. 2a with its device for adjusting the duration of the second phase of the control method according to the invention.

FIG. 5a shows a second variant of the DC-DC converter with a device adjusting duration T2 for implementing the control method according to the invention. This adjustment device includes means for detecting overvoltage across the induction coil terminal Vy at the end of the second phase. These means for detecting the overvoltage sign include mainly a switch 5, a comparator 4 and a D flip-flop 2. As in FIG. 4a, the switches used are preferably a PMOS transistor P1 and an NMOS transistor N1 mounted in series. For the sake of simplification, the DC-DC converter of FIG. 5a also corresponds to the second embodiment described with reference to FIG. 2a, but without output capacitor C and load resistor $R_L$. This type of DC-DC converter supplies an output voltage Vout whose level is higher than the level of input voltage Vbat, which originates, for example from a battery Bat. As this DC-DC converter includes several elements that are identical to those described with reference to FIG. 4a, they will not be explained in detail.

As FIG. 5b also shows, so that duration T2 of the second phase can be adjusted if the duration is too short, or too long, the converter also includes a device for adjusting duration T2. To do this, the adjustment device of the DC-DC converter further includes, between terminal Vy of induction coil L and D flip-flop 2, a comparator 4, a switch 5 and a capacitor Ce at one input of the comparator. The negative input of comparator 4 is connected to the output terminal Vout, whereas the positive terminal of the comparator is connected, via a switch 5, to the connection node Vy of the drain terminals of transistors P1 and N1 and one terminal of induction coil L. A capacitor Ce for storing voltage level Vy connects the positive input of comparator 4 to the earth terminal of the converter. A fourth control signal CK2a controls the opening or closing of switch 5.

Switch 5, which may be an NMOS transistor, is controlled by fourth control signal CK2a and is in a closed state for the entire duration T2, and during a very short additional delay $\tau_1$. The state at node Vy is stored in capacitor Ce like a conventional follower-holder. The fourth control signal CK2a is an inverted replica of the second control signal CK2, but with state 1 extended by this very short additional delay $\tau_1$. This very short delay $\tau_1$ may be of the order of several nanoseconds. Comparator 4 compares the voltage stored in capacitor Ce with the output voltage Vout to define the error sign in second phase duration T2 relative to its ideal value.

Comparator 4 is entirely conventional and consequently does not need to be rapid since the voltages present at the inputs thereof are perfectly stable. Comparator 4 therefore supplies at its output a logic signal that takes state 1 or state 0. This logic signal is stored in the D flip-flop, which is clocked by the third control signal CK2b, which is a replica of signal CK2, but with an additional delay $\tau_1+\tau_2$ at the passage from state 0 to state 1 compared to second control signal CK2. This third control signal CK2b is also delayed by $\tau_2$ relative to the passage of switch 5 from the closed state to the open state, which is controlled by fourth control signal CK2a. This delay $\tau_2$ must be sufficient for the comparator output to be stable at the moment of storage in the D flip-flop.

As previously, all of these operations are repeated at the rhythm of the main converter clock. Output Q of the D flip-flop is thus a binary data flow. The mean of this binary data flow represents the control voltage to be applied to timer 3 so that it supplies signal CK2 of duration T2, which tends to move, by successive approximations, towards its ideal value. The simple low pass filter, which is formed by resistor Ri and capacitor Ci, thus plays the part of the binary flow integrator. This filter is sufficient to generate a continuous voltage V1 for regulating timer 3.

Of course, the device adjusting duration T2 for implementing the control method for the DC-DC converter in discontinuous mode may equally be applied to the basic DC-DC converter structure shown in FIGS. 1a and 3a. However, the first and second controls signals CK1 and CK2 in FIG. 1a are inverted signals of the first and second signals CK1 and CK2 of FIG. 2a. The PMOS transistor P1 must be made conductive in the first phase, whereas the NMOS transistor N1 must be made conductive in the second phase.

From the description that has just been given, those skilled in the art can devise several variants of the DC-DC converter control method without departing from the scope of the invention defined by the claims. The DC-DC converter may include two outputs with a single inductive coil as the reactive element.

What is claimed is:

1. A method of controlling a DC-DC converter, wherein the DC-DC converter includes an induction coil as a reactive element for supplying, in cooperation with a set of at least two alternately operating switches, an output voltage with a higher, equal or lower level than a level of an input voltage provided by a continuous voltage source, wherein the induction coil has terminals, and wherein the method includes the following steps:
   (a) in each successive control cycle, performing a first phase wherein a first control signal controls at least a first switch to make the first switch conductive and to increase a current through the induction coil during a first determined duration; and
   (b) after the first phase, performing a second phase, wherein a second control signal controls at least a second switch to make the second switch conductive and to decrease current through the induction coil during a second adjustable duration, wherein detection means is disposed to detect, at the end of the second phase, a sign of any overvoltage across one of the terminals of the induction coil, connected to the at least two alternating operating switches and for supplying a detection signal, wherein the detection signal is maintained for a determined duration, prior to detection of another successive cycle, in a high state or a low state depending upon sign of detected overvoltage, and timing means that receive the detection signal operate to adapt, in each successive cycle, the second duration of the second phase so as to cancel out current in the induction coil at the end of the second phase.

2. The control method according to claim 1, wherein in each successive control cycle, the detection signal is a binary detection signal integrated in the timing means to supply a mean control voltage to a timer, wherein the timer supplies the second control signal in the second phase whose duration is adapted.

3. The control method according to claim 2, wherein the timer is clocked by a rising or falling edge of the first control signal at an end of the first phase in order to supply the second control signal to make the second switch conductive in the second phase during the second adapted duration.

4. The control method according to claim 1, wherein detection of the overvoltage sign across one terminal of the induction coil at the end of the second phase, by using the detection means, is carried out via a D flip-flop of the detection means, wherein the D flip-flop is clocked in each cycle by a rising edge or falling edge of a third control signal to supply the detection signal as the output voltage.

5. The control method according to claim 4, wherein one input of the D flip-flop is directly connected to the terminal of the induction coil connected to the at least two alternating operating switches, wherein the rising edge or the falling edge of the third control signal for detecting overvoltage acts after a delay after end of the second duration of the second phase and prior to an end of a control cycle in discontinuous mode.

6. The control method according to claim 4, wherein a comparator of the DC-DC converter is connected, via a negative input, to an output voltage terminal and via a positive input to a capacitor for storing the voltage across one terminal of the induction coil, connected to the at least two alternately operating switches through another third switch, wherein the third switch is controlled by a fourth control signal, wherein the overvoltage sign is directly detected by the comparator, wherein the comparator is connected by the third switch controlled by the fourth control signal in a closed state during the entire second duration of the second phase, and at the end of the second duration the third switch is opened to store the overvoltage level across the capacitor so that the comparator supplies an output signal to input of the D flip-flop.

7. The control method according to claim 6, wherein the fourth control signal controls opening of the third switch after a delay following the end of the second duration of the second phase and prior to the end of each control cycle in discontinuous mode, and wherein the rising edge or falling edge of the third control signal for clocking the D flip-flop intervenes after an additional delay after the switch opening delay and prior to the end of each control cycle in discontinuous mode.

8. The DC-DC converter adapted to implement the control method according to claim 1, said converter including:
- an induction coil as a reactive element, for supplying, in cooperation with a set of at least two alternately operating switches, an output voltage with a higher, equal or lower level than a level of an input voltage provided by a continuous voltage source, wherein the induction coil has terminals;
- at least a first switch that is controlled by a first control signal in a first phase of a control cycle;
- at least a second switch that is controlled by a second control signal in a second phase of the control cycle; and
- detection means disposed to detect, at an end of the second phase of each control cycle, sign of any overvoltage across one of the terminals of the induction coil connected to the at least two alternately operating switches and to supply a detection signal to timing means, wherein the detection signal is in a high state or in a low state depending upon the detected overvoltage sign, and the timing means adapts, in each successive cycle, the second duration of the second phase so as to cancel out current in the induction coil at the end of the second phase.

9. The DC-DC converter according to claim 8, wherein the detection means includes a D flip-flop, wherein one input of the D flip-flop is directly connected to one terminal of the induction coil connected to the at least two alternately operating switches, wherein said D flip-flop is clocked by a rising edge or a falling edge of a third control signal that intervenes after the end of the second phase to supply the detection signal in a high state or in a low state.

10. The DC-DC converter according to claim 8, wherein the detection means includes a comparator that is connected, via a negative input, to an output voltage terminal and via a positive input to a capacitor for storing voltage across one terminal of the induction coil, wherein the comparator is connected to the at least two alternately operating switches via another third switch that is controlled by a fourth control signal so that the third switch is in a closed state during each second phase and in an open state after a first delay following the second phase, and an output signal of the comparator is supplied to a D flip-flop that is clocked by a rising edge or a falling edge of a third control signal that intervenes after a second delay following opening of the third switch to supply the detection signal in a high state or in a low state.

11. The DC-DC converter according to claim 8, wherein the timing means includes
- an integrator that is formed of a resistor connected to output of the detection means;
- a capacitor; and
- a timer connected to a connection node of the resistor and the capacitor, wherein the voltage of the connection node is stored across the capacitor and controls the timer to determine the second duration of the second phase.

* * * * *